July 23, 1929.  F. G. HAWNEY  1,721,661
LAWN TRIMMER
Filed Dec. 5, 1927
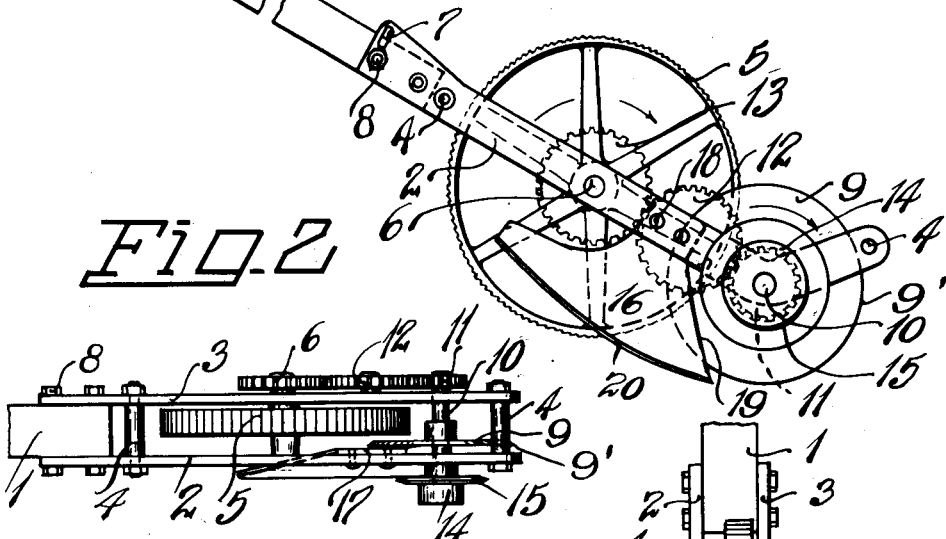
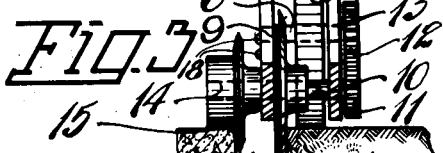
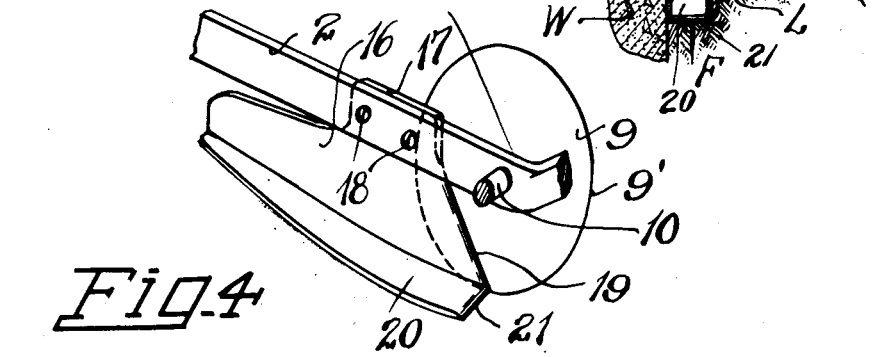
Inventor
Frederick G. Hawney
By Herbert E. Smith
Attorney Patented July 23, 1929.

1,721,661

UNITED STATES PATENT OFFICE.

FREDERICK G. HAWNEY, OF SEATTLE, WASHINGTON.

LAWN TRIMMER.

Application filed December 5, 1927. Serial No. 237,617.

My present invention relates to improvements in lawn trimmers of the walking type designed primarily to trim the edges of a lawn to insure a neat appearance for the latter. The device of my invention involves the use of a rotary cutter for trimming the edge of the lawn and in addition I use a sliding cutter to cut a swath or groove or furrow between the trimmed edge of the lawn and the adjoining edge of the side-walk. The device of my invention is provided with means whereby the trimmer may be operated with facility and guided along the edge to be cut or trimmed in order that the edge of the lawn may be trimmed accurately and the appearance of the lawn thereby enhanced.

The invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have so far devised for the practical application of the principles of my invention.

Figure 1 is a view in side elevation showing an implement involving the novel features of my invention.

Fig. 2 is a top plan view of the operating parts of the implement, the handle being broken away for convenience of illustration.

Fig. 3 is a front view of the implement with the handle broken away showing the relation of the implement to the lawn, side-walk and furrow cut therebetween.

Fig. 4 is a perspective view showing the rotary cutting disk and the sliding or slicing cutter.

In carrying out my invention the implement is fashioned somewhat similar to a lawn mower and is provided with a handle 1 which is secured between the side plates or side straps 2 and 3 by the bolts 4. A driving wheel 5 is provided with an axle or shaft 6 and is journalled between the side plates 2 and 3 to run along the edge of the lawn and support the implement as well as drive its operating parts.

The side plates are provided with slots 7 and adjusting bolts 8 by means of which the handle 1 may be adjusted with relation to the side plates for the convenience of the person operating the machine.

A rotary cutter 9 in the form of a circular disk with a bevel edge 9', is journalled by means of its shaft 10 in the side plates 2 and 3, and this rotary cutter is driven through a chain of gears including the pinion 11 on the shaft 10 and intermediate gear 12, and a driving gear 13 on the shaft 6. Thus as the implement rides along on the wheel 5 the rotary cutter is driven through this chain of gears and as the rotary cutter is located with its cutting edge below the driving wheel it will be seen that the cutter trims the edge of the lawn L, to insure a neat appearance for the lawn.

The implement is provided with a guide wheel 14 which travels along the edge of the side-walk W and this wheel has an annular flange 15 to run along the edge of the side-walk and guide the implement. The guide wheel is journalled on the shaft 10 and is spaced from the rotary cutter and these parts run along the edge of a furrow F formed between the edge of the lawn L and the edge of the side-walk W.

A plow or slicing cutter is also used in the formation of the furrow F. This cutter includes a plow 16 having a flange 17 that is bolted at 18 to the side plate 2 and the plow has a cutting edge 19 located adjacent to the lower part of the rotary disk 9. The plow also has a bottom flange 20 with a front cutting edge 21, and it will be apparent that the fixed cutter or plow 16 coacts with the rotary cutter 9 in the formation of the furrow F as the rotary cutter 9 trims the edge of the lawn. The cutting flange 20 of the plow forms a smooth bottom for the furrow F and of course the depth of the furrow cut by this flange is determined by the guide wheel 14 running along on the side-walk W.

By this means it will be apparent that the implement may be pushed or shoved along the edge of the lawn and its parts are operated for carrying out the purposes of my invention.

Having thus fully described my invention what I claim as new and desire to secure by Letters Patent is:

The combination in a hand implement of the lawn mower type comprising a handle and spaced side plates forming a frame, of a driving wheel journaled in the frame, a rotary disk-cutter and its shaft journaled in the frame and a spaced, flanged, guide wheel on the said shaft, driving gears between said driving wheel and cutter shaft, a plow fixed on one of said plates between said rotary disk-cutter and guide wheel, and a laterally extending flange on the plow having its free edge alined with the flanged guide wheel.

In testimony whereof I affix my signature.

FREDERICK G. HAWNEY.